(12) United States Patent
Schray

(10) Patent No.: US 6,901,200 B2
(45) Date of Patent: May 31, 2005

(54) MODULE AND HOUSING FOR OPTICAL FIBER DISTRIBUTION AND DWDM EQUIPMENT

(75) Inventor: Steven John Schray, Princeton, MA (US)

(73) Assignee: Fiber Optic Network Solutions, Inc., Marlborough, MA (US)

( * ) Notice: Subject to any disclaimer, the term of this patent is extended or adjusted under 35 U.S.C. 154(b) by 109 days.

(21) Appl. No.: 10/035,031

(22) Filed: Dec. 21, 2001

(65) Prior Publication Data

US 2002/0181924 A1 Dec. 5, 2002

Related U.S. Application Data

(60) Provisional application No. 60/258,178, filed on Dec. 22, 2000.

(51) Int. Cl.$^7$ .................................................. G02B 6/00
(52) U.S. Cl. ........................................ 385/135; 439/137
(58) Field of Search ............................. 385/135, 136, 385/137

(56) References Cited

U.S. PATENT DOCUMENTS

| 4,111,524 A | 9/1978 | Tomlinson, III | 350/96.19 |
|---|---|---|---|
| 4,486,071 A | 12/1984 | Levinson | 350/96.18 |
| 4,583,820 A | 4/1986 | Flamand et al. | 350/96.19 |
| 4,622,662 A | 11/1986 | Laude et al. | 370/3 |
| 4,634,215 A | 1/1987 | Reule | 350/96.16 |
| 4,651,315 A | 3/1987 | Laude | 370/3 |
| 4,675,860 A | 6/1987 | Laude et al. | 370/3 |
| 4,744,618 A | 5/1988 | Mahlein | 350/96.19 |
| 4,748,614 A | 5/1988 | Dammann et al. | 370/3 |
| 4,819,224 A | 4/1989 | Laude | 370/3 |
| 4,824,196 A | 4/1989 | Bylander | 385/134 |
| 4,836,634 A | 6/1989 | Laude | 350/96.19 |
| 4,861,134 A | 8/1989 | Alameel et al. | 350/96.2 |
| 4,923,271 A | 5/1990 | Henry et al. | 350/96.19 |
| 4,995,688 A | 2/1991 | Anton et al. | 350/96.1 |
| 5,011,257 A | 4/1991 | Wettengel et al. | 385/53 |
| 5,090,792 A | 2/1992 | Koht et al. | 385/32 |
| 5,100,221 A | 3/1992 | Carney et al. | 385/135 |
| 5,127,082 A | 6/1992 | Below et al. | 385/135 |
| 5,363,465 A | 11/1994 | Korkowski et al. | 385/135 |
| 5,457,573 A | 10/1995 | Iida et al. | 359/569 |
| 5,708,742 A | 1/1998 | Beun et al. | 385/53 |
| 5,778,130 A | 7/1998 | Walters et al. | 385/134 |
| 5,808,763 A | 9/1998 | Duck et al. | 359/127 |
| 5,903,698 A | 5/1999 | Poremba et al. | 385/135 |
| 5,917,625 A | 6/1999 | Ogusu et al. | 359/130 |
| 5,960,133 A | 9/1999 | Tomlinson | 385/18 |
| 5,969,294 A | 10/1999 | Eberle et al. | 174/57 |
| 5,975,769 A | 11/1999 | Larson et al. | 385/53 |
| 5,987,203 A | 11/1999 | Abel et al. | 385/51 |
| 6,084,695 A | 7/2000 | Martin et al. | 359/131 |
| 6,108,471 A | 8/2000 | Zhang et al. | 385/37 |
| 6,130,971 A | 10/2000 | Cao | 385/31 |
| 6,167,183 A | 12/2000 | Swain | 385/135 |
| 6,208,796 B1 | 3/2001 | Vigliaturo | 385/135 |
| 6,556,763 B1 * | 4/2003 | Puetz et al. | 385/135 |

FOREIGN PATENT DOCUMENTS

| EP | 1 008 878 | 6/2000 |
|---|---|---|
| WO | WO 88/07216 | 9/1988 |
| WO | WO 01/14921 | 3/2001 |

\* cited by examiner

*Primary Examiner*—Chandrika Prasad
(74) *Attorney, Agent, or Firm*—Bowditch & Dewey, LLP

(57) ABSTRACT

A modular assembly for a dense wavelength division multiplexing system a base having at least one handle, a first connector panel attached to the base, a second connector panel attached to the base, a multiplexing clamp, a first splice platform and a second splice platform.

5 Claims, 7 Drawing Sheets

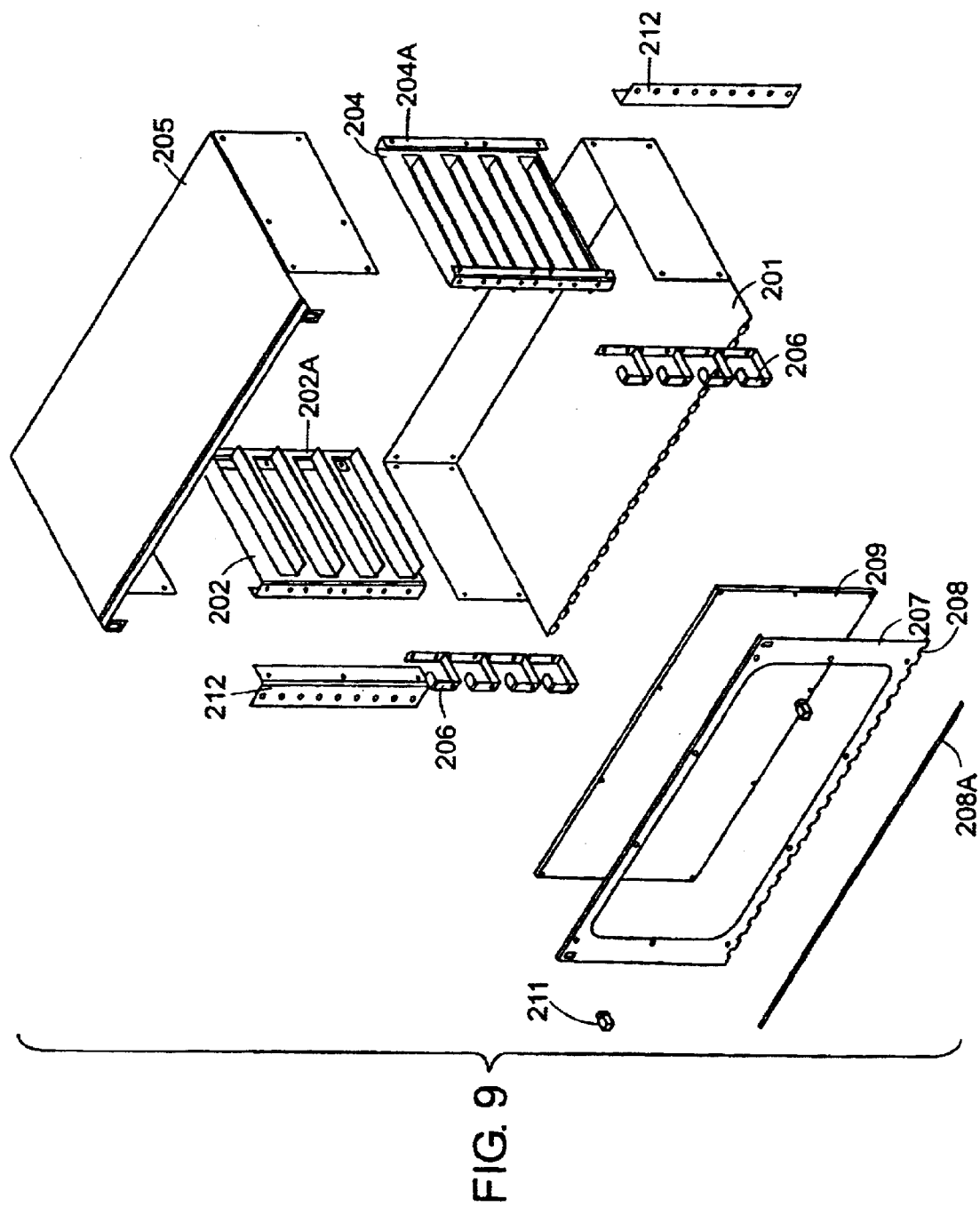

MODULE AND HOUSING FOR OPTICAL FIBER DISTRIBUTION AND DWDM EQUIPMENT

CROSS REFERENCES TO RELATED APPLICATIONS

The present application claims the benefit of U.S. Application No. 60/258,178, filed Dec. 22, 2000, the entire contents of the above application is incorporated herein by reference.

BACKGROUND OF THE INVENTION

With the growth of fiber optic communication systems, numerous devices have been developed to house and manage the complex assemblies needed. However, there remains a continuing need for improvements to lower cost, increase efficiency and provide for ease maintenance.

SUMMARY OF THE INVENTION

The present invention relates to improvements in wavelength division multiplexing systems providing more efficient fiber optic connectivity and maintenance. A module having a base panel with one or more handles, DWDM clamps, a lower splice platform and an upper splice platform is used to access and control fiber management. A housing is used to hold pluralities modules.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is an exploded view of the housing of FIG. 6.

DETAILED DESCRIPTION OF THE INVENTION

Figure 1:
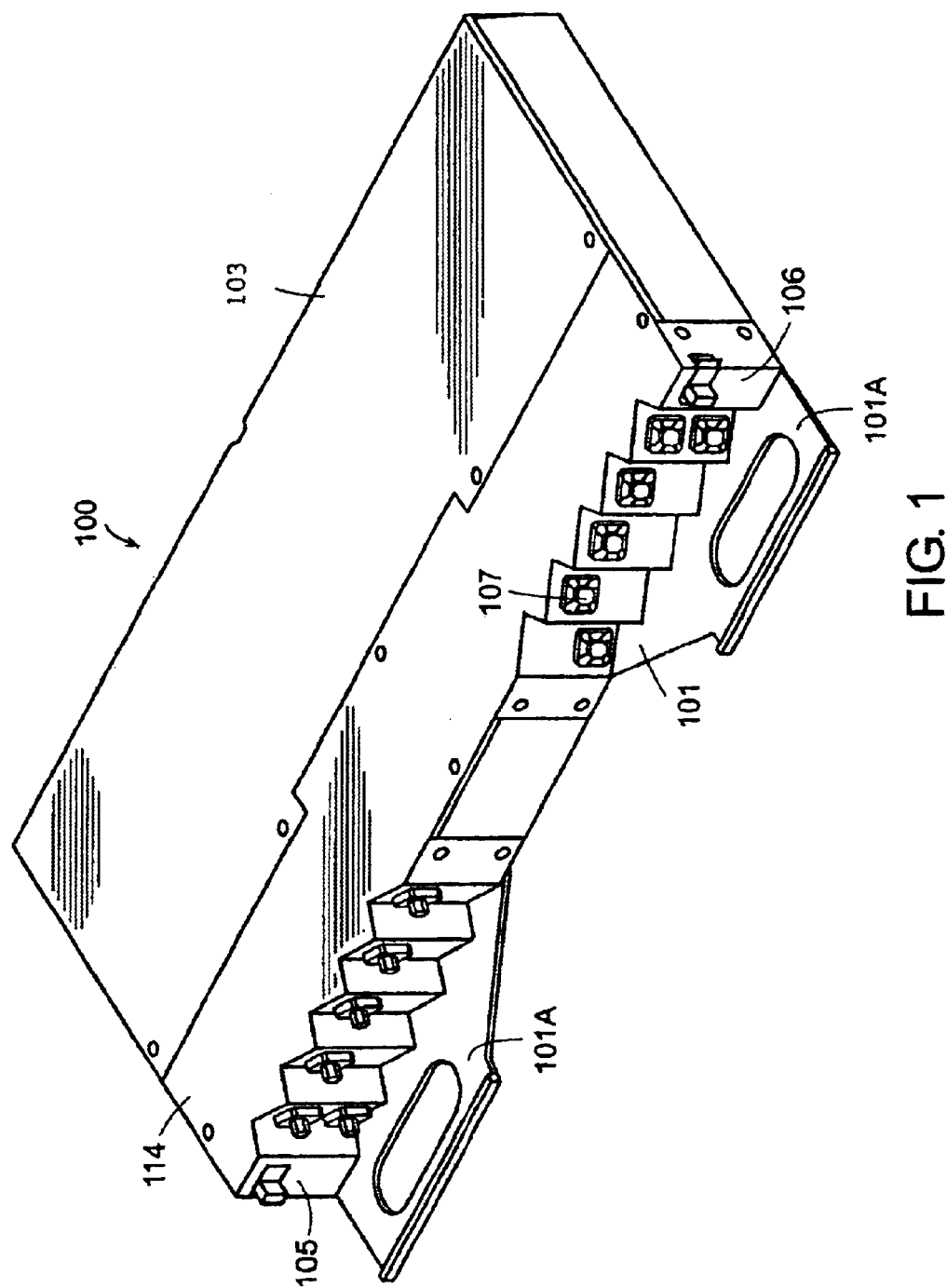
FIG. 1 is a perspective view of an embodiment of a module for fiber optic equipment.
Figure 2:
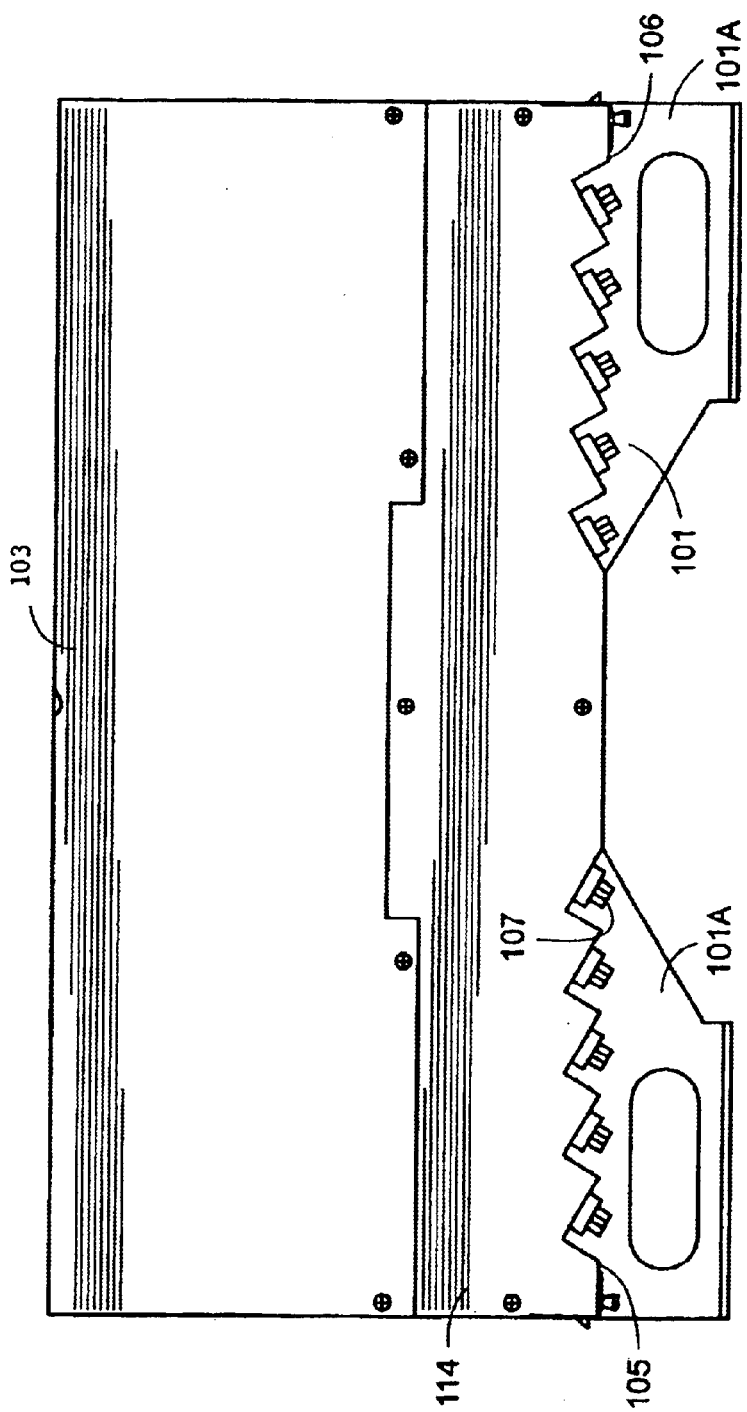
FIG. 2 is a top view of the module of FIG. 1.
Figure 3:
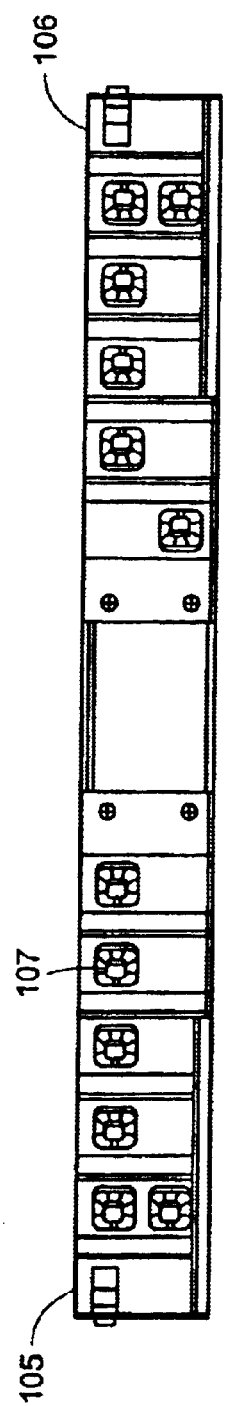
FIG. 3 is a front view of the module of FIG. 1.

FIGS. 1–5A, 5B illustrate an embodiment of a module 100 for fiber optic equipment. FIG. 1 shows, by way of a perspective view, elements of the module 100 that include stepped or angled front cover 114, rear cover 115, left front panel 105, right front panel 106 and body shelf or base panel 101 with integral handles 101A. The left and right front panels 105, 106 are angled and include standard fiber adapters 107. FIG. 2 is a top view and FIG. 3 is a front view of the module 100.

Figure 4:
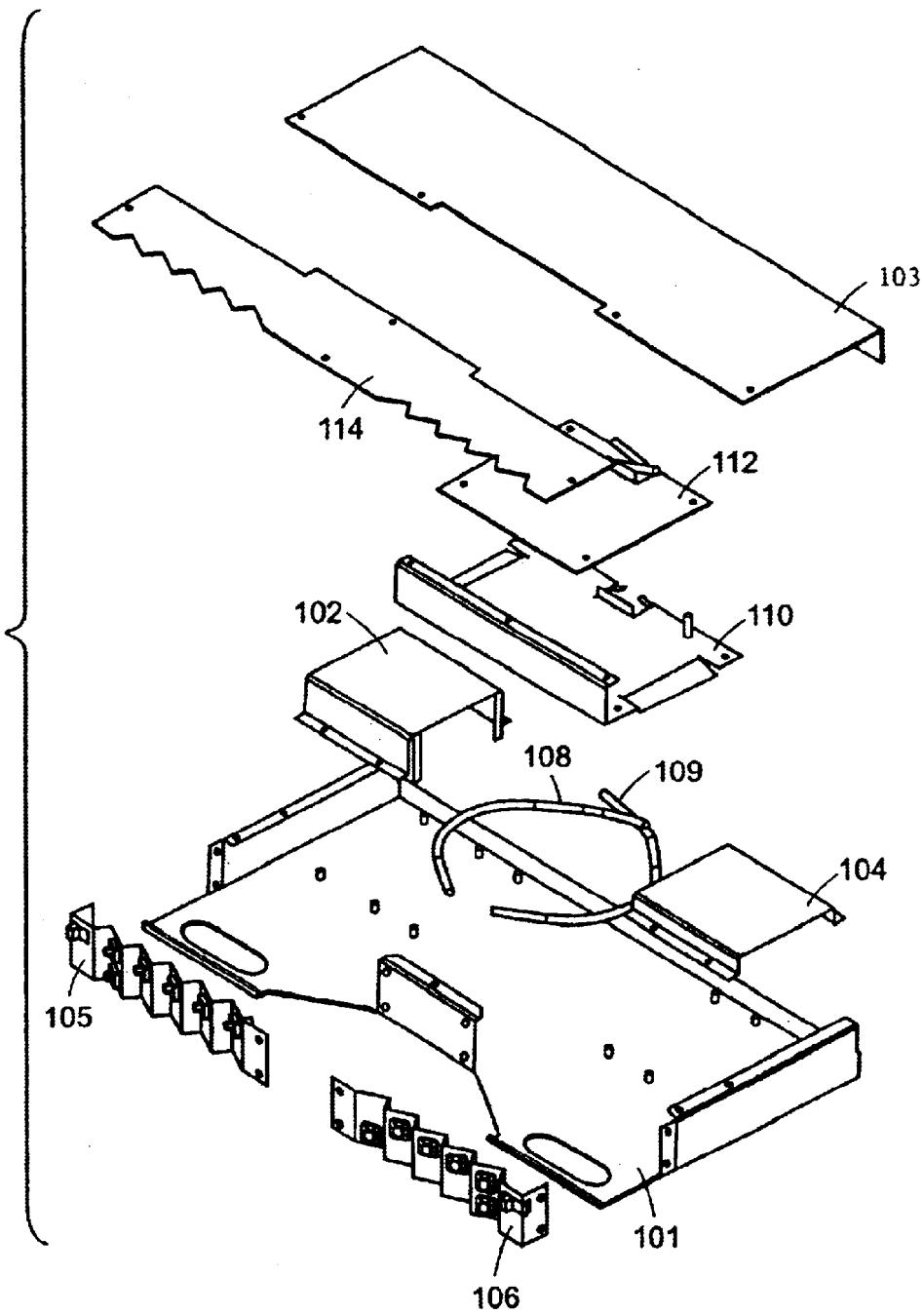
FIG. 4 is an exploded view of the module of FIG. 1.
Figure 5A:
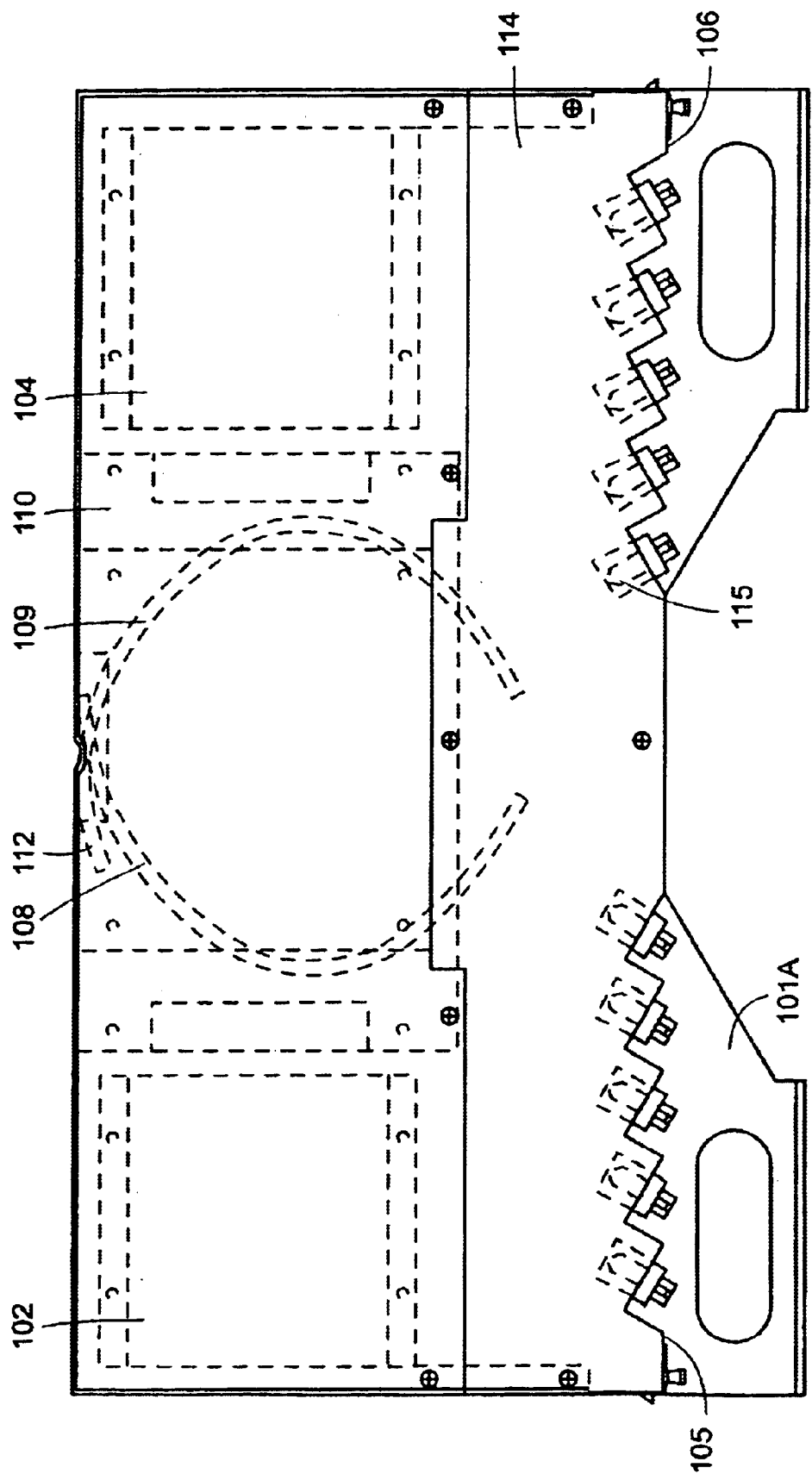
FIG. 5A is a top view of the module of FIG. 1 with hidden lines visible.

FIG. 4 is an exploded view of the module 100 which shows the assembly of the module. As shown in this view, the module further includes double DWDM clamp 102, single DWDM clamp 104, lower splice platform 10, upper splice platform 112 and spiral wraps 108, 109. FIG. 5A is a top view of the module 100 with hidden lines visible. In particular, the hidden lines of double DWDM clamp 102, single DWDM clamp 104, lower splice platform 110, upper splice platform 112 and spiral wraps 108, 109 are visible in this view.

Figure 5B:
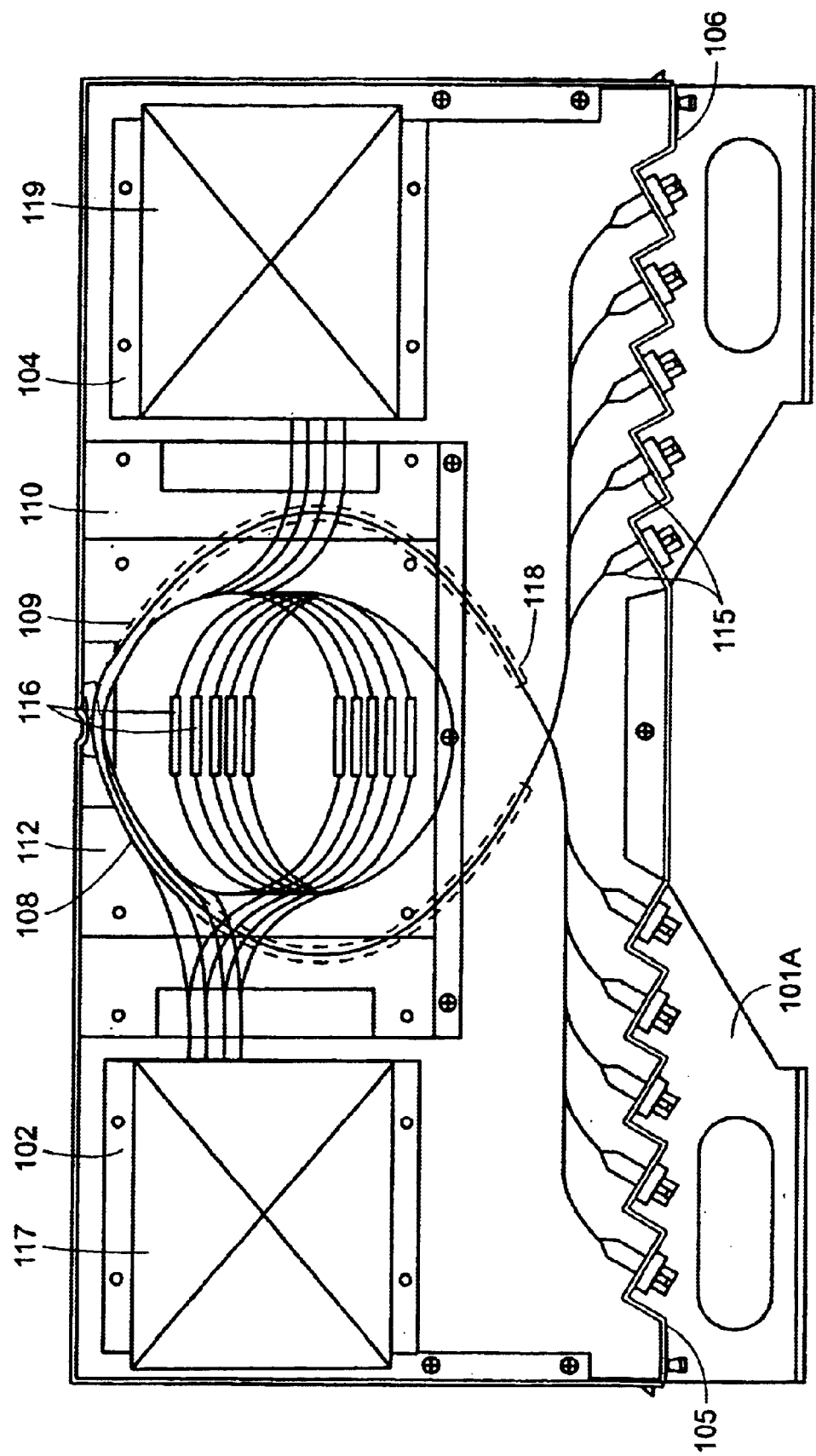
FIG. 5B is a top view of the module of FIG. 1 with fiber optic equipment located therein.

FIG. 5B is a top view of the module 100 with fiber optic equipment mounted therein. In particular, dense wavelength division multiplexing (DWDM) devices 117, 119 are shown mounted using the DWDM clamps 102, 104. For example, Avanex DWDM devices can be mounted therein. The single DWDM clamp 104 is adapted for mounting one such device. The double DWDM clamp 102 is adapted for mounting two such devices.

FIG. 5B also shows the routing of optical fibers 118 that connect between connectors 115 on the front panels 105, 106 and the DWDM devices 117, 119 through splices 116.

The clamps 102, 104 hold the DWDM devices in place so that the fiber pigtails exit the DWDM devices toward the center of the module. The clamps 102, 104 are padded to provide isolation from vibration transferred by the module itself.

The splice platforms 110, 112 are located between the clamps 102, 104 that hold the DWDM devices. The splice platforms provide for fiber management and mounting of the splices 116. The upper splice platform 112 accommodates additional splices if needed beyond those provided by the lower splice platform 110. The spiral wraps 108, 109 are used for managing the optical fiber pigtails that exit from the DWDM devices and connect to the standard fiber adapters 107 on front panels 105, 106. In particular, the fibers connected to the adapters are routed underneath the lower splice platform 110 in a half coil using the spiral wraps 108, 109. Use of the spiral wraps limits the possibility of breaking a fiber while servicing the connectors due to hard pulling. If a fiber is be pulled hard, the spiral wrap deforms which prevents a large stress on any point on the fiber. Another advantage of the embodiment of the module described herein is that prewiring of the modules is facilitated such that the DWDM devices can be placed into the modules and fibers spliced thereto.

The body shelf 101 of the module 100 provides a support for the optical fiber cables that connect to the adapters 107 of front panels 105, 106 of the module. The integral pair of handles 101 A of body shelf 101 facilitate insertion and removal of the module from the housing 200 (described herein below).

Figure 6:
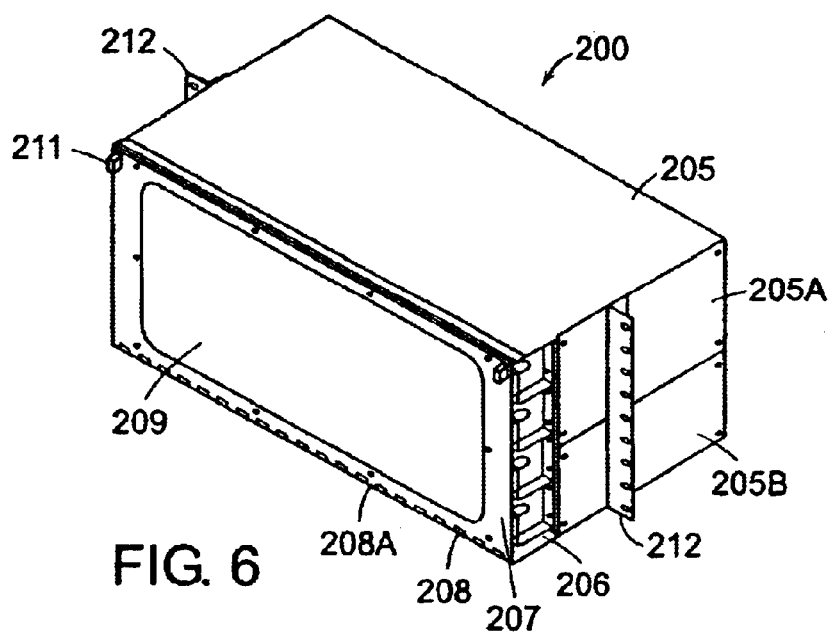
FIG. 6 is a perspective view of an embodiment of a housing for holding four modules.
Figure 7:
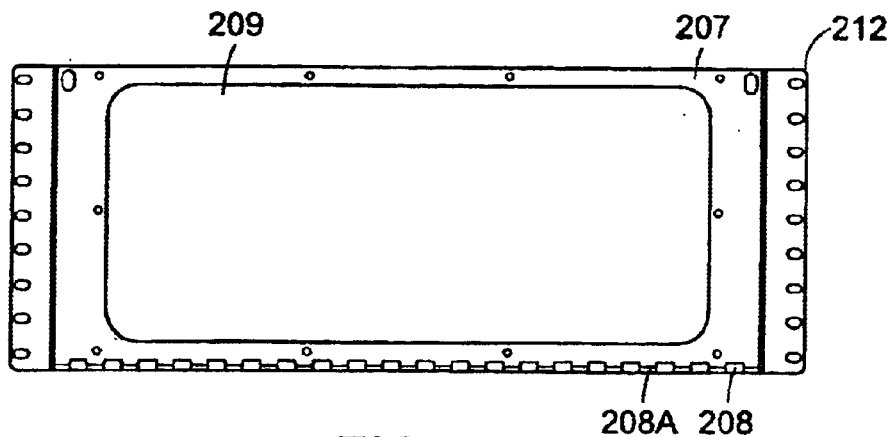
FIG. 7 is a front view of the housing of FIG. 6.
Figure 8:
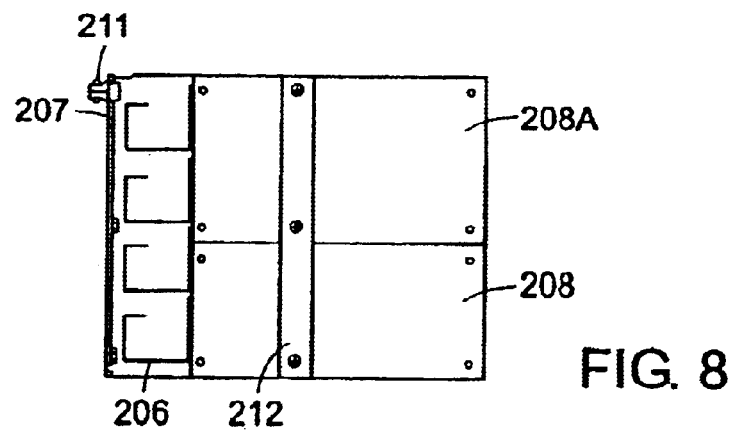
FIG. 8 is a right side view of the housing of FIG. 6.

FIGS. 6–9 illustrate an embodiment of a housing 200 for holding up to four modules 100. FIG. 6 shows, by way of a perspective view, elements of the housing 200 that include top panel 205, top and bottom side panels 205A, 205B, angle mounts 212, fiber supports 206, front door unit 207 with integral door hinge 208, door hinge pin 208A, door window 209 and latches 211. FIG. 7 is a front view and FIG. 8 is a right side view of the housing 200.

FIG. 9 is an exploded view of the housing 200 which shows the assembly of the housing. As shown in this view, the housing further includes bottom panel 201 and left and right side mounting units 202, 204. The left and right side mounting units include tabs or lips 202A, 204A which serve to support the modules 100 (FIGS. 1–5A, 5B).

While this invention has been particularly shown and described with references to preferred embodiments thereof, it will be understood by those skilled in the art that various changes in form and details may be made therein without departing from the scope of the invention encompassed by the appended claims.

What is claimed is:

1. A module for a wavelength division multiplexing system comprising:
   a plurality of fiberoptic adapters for connecting and routing of fiber optic cables, the plurality of adapters having at least a first adapter and second adapter associated therewith;
   a first connector panel having a first stepped face comprising a plurality of steps, each of the plurality of first steps having an essentially planar surface capable of receiving the first adapter;
   a second connector panel having a second stepped face comprising a plurality of steps, each of the plurality of second steps having an essentially planar surface capable of receiving the second adapter;
   a base essentially planar in shape and releasably attached to the first and second connector panels, the base further having a handle integral therewith for facilitating removal of the module;
   a multiplexing clamp releasably mounted to the base;
   a first splice platform releasably mounted to at least one of the base, or the multiplexing clamp; and
   a second splice platform located proximate to the first splice platform and releasably mounted to at least one of the base, the multiplexing clamp, and the first splice platform.

2. The module of claim 1 wherein the planar surface of each of the first steps is oriented in a first direction.

3. The module of claim 1 wherein the planar surface of each of the second steps is oriented in a second direction, the second direction being non-parallel to the first direction.

4. The module of claim 1 further comprising:
   a cover opposedly mounted from the base and releasably attached to the first and second panels.

5. The module of claim 1 wherein the handle is formed from said planar base having a hole there through.

* * * * *